C. W. BOMAN.
CLINICAL THERMOMETER CASING.
APPLICATION FILED SEPT. 8, 1911.
1,024,824.
Patented Apr. 30, 1912.
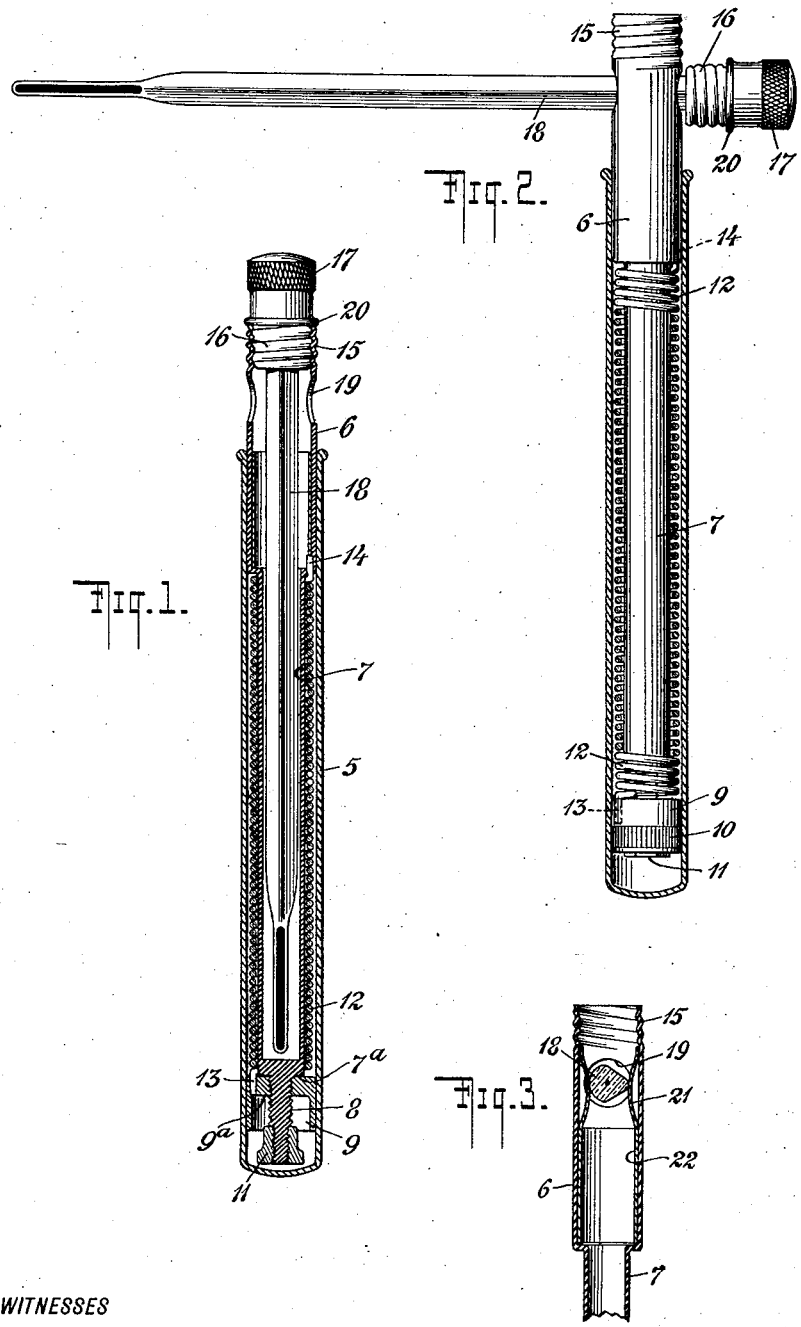
WITNESSES
INVENTOR·
CLAES W. BOMAN
BY
ATTORNEYS

UNITED STATES PATENT OFFICE.

CLAES W. BOMAN, OF NEW YORK, N. Y., ASSIGNOR TO CHARLES J. TAGLIABUE, OF BROOKLYN, NEW YORK.

CLINICAL-THERMOMETER CASING.

1,024,824.  Specification of Letters Patent.  Patented Apr. 30, 1912.

Application filed September 8, 1911. Serial No. 648,364.

*To all whom it may concern:*

Be it known that I, CLAES W. BOMAN, a citizen of the United States, and resident of the borough of Brooklyn, county of Kings, city and State of New York, have invented certain new and useful Improvements in Clinical-Thermometer Casings, of which the following is a specification.

My invention relates to devices for returning the mercury to the bulb of a clinical thermometer and has for its particular object to construct the usual carrying case for such thermometers in such a manner that the same in addition to serving as a protecting or carrying medium for clinical thermometers may also be utilized as a means for generating centrifugal force for returning the mercury to the thermometer bulb after a reading has been taken.
My invention will be fully described hereinafter and the features of novelty will be pointed out in the appended claims.

Reference is to be had to the accompanying drawings in which—
Figure 1 is a longitudinal section of a thermometer casing constructed according to my invention with the thermometer in position therein. Fig. 2 is a similar view showing the case in use as a device for returning the mercury to the thermometer bulb and with the parts in a different position from that shown in Fig. 1, and Fig. 3 is a similar view of the upper portion of the casing taken in a plane at right angles to the sectional plane of Fig. 1.

In the drawings, the casing comprises a tubular body portion or main section 5 having its one end closed in the usual manner and its opposite end open. A secondary or thermometer carrying section 6 fits snugly into the open end of the section 5, in such a manner as to be rotatable relatively thereto, said section 6 being provided with a tubular stem 7 of reduced diameter and extending lengthwise of the section 5. An externally screw-threaded projection 8 extends from the lower end of the stem 7, and is in screw-threaded engagement with a bearing sleeve 9, which has a screw-threaded axial opening for the accommodation of said projection. This bearing sleeve is frictionally secured in the section 5, and is preferably provided with a roughened portion 10, adapted to make the connection between said sleeve and the section 5 a rigid one. A nut or other stop 11, arranged to coöperate with said sleeve in a manner to be described hereinafter, is screwed or otherwise secured upon a reduced portion of the projection 8, as clearly shown in Fig. 1. A coiled spring 12 extends lengthwise of and surrounds the tubular stem 7, and has its one end 13 secured to the sleeve 9 and its other end 14 secured to the thermometer carrying section 6 for the purpose to be more clearly brought out further on in the description. The free open end of the thermometer carrying section 6 is preferably screw-threaded as indicated at 15 for the accommodation of a screw-threaded neck 16 of a cap 17, in which the one end of the thermometer 18 is rigidly secured, said cap being provided with a flange 20 which serves as a stop to limit the inward screwing movement of the neck 16. The said thermometer carrying section is further provided with diametrically opposite openings 19 of a size to permit the thermometer 18, to be readily inserted therethrough.

From an inspection of Fig. 1 it will readily be seen that when the screw-threaded neck 16 is screwed into the end 15 of the thermometer carrying section 6, the casing serves as a protecting or carrying medium with the thermometer extending axially or lengthwise thereof in the usual manner. When it is desired to take a temperature the thermometer is removed from the case by simply unscrewing the neck 16 from the end 15, after which the thermometer may be used in the usual and ordinary way. After a reading has been had and it is desired to return the mercury to the bulb of said thermometer, the tube thereof is passed through the openings 19 with its axis extending at substantially right angles to the axis of the casing as clearly shown in Fig. 2. In this condition of the parts, the sleeve 16 serves as a stop and butts against the wall of the thermometer carrying section 6 to prevent the thermometer from being forced through the openings 19 in one direction. The main section 5 of the casing is now held in one hand, preferably with the axis thereof extending in a horizontal direction and with the other hand the thermometer is moved in a circular path. This will cause the thermometer carrying section 6, the tubular stem 7, projection 8 and stop 11 to be rotated about their common axis and relatively to the section 5 and the bearing sleeve 9 and will twist or torsionally wind the spring 12, rotative movement of the bearing sleeve 9 relatively to the section 5 being prevented by the roughened portion 10. The torsional winding of the spring, or in other words, the rotation of the section 6, and with it the tubular stem 7 and screw-threaded projection 8, to thus wind or twist the spring 12, will cause a movement of said thermometer carrying section 6 and its connected parts in the direction of its axis owing to the screw-threaded engagement between the projection 8 and the screw-threaded axial opening of the bearing sleeve 9. This lengthwise movement will continue until the nut 11 is brought into engagement with the transverse portion or shoulder 9ª of the bearing sleeve 9, whereupon such lengthwise movement and the rotative movement of the thermometer carrying section and consequently the torsional winding of the spring will be arrested. After the spring has been thus wound or twisted it will exert a torsional stress upon the sections 5 and 6, and have a tendency to move the thermometer carrying section 6 in a rotative direction opposite to that in which the spring 12 was wound, as soon as the restraining influence of the hand of the user is removed from the thermometer. When the thermometer is released this torsional stress will rotate the said thermometer carrying section 6 in said opposite direction about its own axis and will rapidly whirl or swing the thermometer in a circular path. The centrifugal force generated through this rapid whirl or swinging of the thermometer will cause the mercury to fly toward the mercury bulb and thus back to normal position, the screw-threaded neck 16 meanwhile preventing said centrifugal force from forcing the thermometer tube out of the openings 19. During this reverse movement of the thermometer carrying section, or in other words, during the circular whirling or swinging of the thermometer as described, the thermometer carrying section 6, tubular stem 7 and screw-threaded projection 8 will move lengthwise of the casing in a direction opposite to that in which these parts moved during the winding of the spring, such reverse lengthwise movement continuing until the shoulder 7ª of the stem 7 comes into contact with the surface of the bearing sleeve 9, as shown in Fig. 1, and then being arrested.

During the operations just described as before stated the casing is preferably held in a horizontal position with the thermometer depending from the section 6, at the beginning of said operations and the shoulder 7ª is so located that at the end of the whirling or swinging of the thermometer as the spring unwinds, the parts will have returned to the same position and the thermometer will again depend in the same manner. This construction does away with the possibility of the thermometer accidentally dropping out of the openings 19 at the end of the whirling motion, or after the mercury has been returned to the bulb, as might be the case if, for instance, at the end of the whirling movement the cap 17 and neck 16 were below the axis of the casing with the thermometer projecting upwardly. In other words, the neck 16 and cap 17 at all times prevent an accidental dislocation of the thermometer when the device is in use. To further guard against accidental removal of the thermometer from the openings 19, I may provide the resilient fingers 21 located on opposite sides of a line passing through the openings 19 and exerting a pressure toward each other to grip the thermometer as shown in Fig. 3. These fingers 21 may be secured in the section 6 in any suitable manner; for instance, as shown in Fig. 3, these fingers 21 may project upwardly from a sleeve 22, which is in frictional engagement with the inner surface of the sleeve 6.

It will be seen that my improvement provides a ready and easily manipulated medium for returning the mercury to the bulb of the thermometer and does away with the usual and dangerous shaking or jerking of the thermometer, an operation which ofttimes results in injury to the thermometer when performed by inexperienced persons. The operation of returning the mercury to the bulb of a thermometer is also much quicker when my improved device is used than it is with the ordinary shaking or jerking of said thermometer, so that the thermometer may be made ready for successive use in a minimum period of time. My improved device, therefore, overcomes one of the greatest objections to the use of a clinical thermometer by inexperienced persons and also provides a simplified means for quickly returning the mercury to the thermometer bulb for use by experienced persons, such as physicians, nurses and the like.

It is to be understood that while I prefer to make my improved device in the form of a casing which may be used as a medium for carrying and protecting the thermometer when not in use, this need not necessarily be so. In other words, my improvement may be an instrument by itself and may be used in connection with or as an auxiliary to the ordinary thermometer casing without any function as a case but serving only as a device for returning the mercury to the bulb of the thermometer. With my improved construction it is absolutely impossible to overwind the spring 12, and it is also impossible for the thermometer to accidentally drop from the openings 19 after the device has been used for the purpose of returning the mercury to the thermometer bulb. If desired, instead of arresting said whirling movement through the engagement of the shoulder 7ᵃ and bearing sleeve 9, the same result may be secured by permitting the stop 11 to contact with the inside surface of the bottom of the section 5. The tubular stem is preferably made of a diameter slightly larger than the diameter of the thermometer tube so that if the neck 16 should not exactly fit the end 15 of the section 6 and the thermometer have a tendency to wabble, this tendency would be practically overcome by said stem. The said stem also serves as an additional protecting medium so that with my improved construction when the device is in the form of a thermometer casing the said thermometer is doubly protected against breakage or other injury when not in use. It is further to be understood that the thermometer may be secured in the section 6 in the position shown in Fig. 1 in other ways than through the medium of a screw threaded neck and cap 17. In addition to this, if found desirable, the clamping fingers 21 may be omitted, in which case the opening 19 would preferably be made of a diameter to frictionally engage the thermometer tube when the thermometer is in the position shown in Fig. 2. The spring 12, in addition to serving as a medium for producing a whirling of the thermometer, also serves to maintain the thermometer carrying section in position in the section 5 and to prevent accidental axial displacement thereof.

Various changes in the specific construction shown and described may be made within the scope of the claims without departing from the nature of my invention.

I claim:—

1. A device for returning the mercury to the bulb of a thermometer comprising two sections movable relatively to each other, one of said sections forming a thermometer carrying section and being provided with a means for removably connecting a thermometer therewith, means for moving said thermometer carrying section relatively to the other section and means for arresting the movement of said thermometer carrying section.

2. A device for returning the mercury to the bulb of a thermometer comprising two sections movable relatively to each other, one of said sections being provided with a means for removably connecting a thermometer therewith, a normally inactive means connected with each section and adapted to be brought to an active condition by a relative movement of said sections and then to move said thermometer carrying section to return the mercury to the bulb and means for arresting the movement of said sections.

3. A device for returning the mercury to the bulb of a thermometer comprising two sections movable relatively to each other, one of said sections being provided with a means for removably connecting a thermometer therewith, a normally inactive means connected with each section and adapted to be brought to an active condition by a movement of the thermometer carrying section in one direction and then to move said thermometer carrying section in another direction to return the mercury to the bulb and means for arresting the movement of said thermometer carrying section in both directions.

4. A device for returning the mercury to the bulb of a thermometer comprising two sections rotatable relatively to each other, one of said sections being provided with means for supporting a thermometer with its axis extending across the axis of said section, means arranged to rotate the thermometer carrying section relatively to the other section and a stop for arresting the movement of said thermometer carrying section.

5. A device for returning the mercury to the bulb of a thermometer comprising two sections rotatable relatively to each other, one of said sections being provided with means for supporting a thermometer with its axis extending across the axis of said section, means arranged to rotate the thermometer carrying section relatively to the other section and a stop connected with said thermometer carrying section for arresting the movement thereof.

6. A device for returning the mercury to the bulb of a thermometer comprising a main section and a thermometer carrying section extending lengthwise thereof, said sections being rotatably relatively to each other, a sleeve rigidly secured interiorly of said main section and forming a bearing for said thermometer carrying section, and a spring connected with said sleeve and said thermometer carrying section, and arranged to be wound to exert a torsional stress on said section and to rotate the thermometer carrying section relatively to the main section when released.

7. A device for returning the mercury to the bulb of a thermometer comprising a main section and a thermometer carrying section rotatable relatively to each other, a bearing sleeve rigidly secured in said main section, a spring connected with said sleeve and said thermometer carrying section and arranged to be wound to exert a torsional stress on said sections and to rotate the thermometer section relatively to the main section when released and a stop connected with said thermometer carrying section adapted to engage said bearing sleeve to arrest the winding of the spring.

8. A device for returning the mercury to the bulb of a thermometer comprising a main section and a thermometer carrying section rotatable relatively to each other, a bearing sleeve rigidly secured in said main section, a spring connected with said sleeve and said thermometer carrying section and arranged to be wound to exert a torsional stress on said sections and to rotate the thermometer section relatively to the main section when released and a stop connected with said thermometer carrying section adapted to engage said bearing sleeve to arrest the rotative movement of said thermometer carrying section.

9. A device for returning the mercury to the bulb of a thermometer comprising a main section and a thermometer carrying section rotatable relatively to each other, a bearing sleeve rigidly secured in said main section, a spring connected with said sleeve and said thermometer carrying section and arranged to be wound to exert a torsional stress on said sections and to rotate the thermometer section relatively to the main section when released and a stop connected with said thermometer carrying section adapted to engage said bearing sleeve to arrest the winding of the spring, and to engage said bearing sleeve to arrest the rotative movement of said thermometer carrying section.

10. A device for returning the mercury to the bulb of a thermometer comprising a main section and a thermometer carrying section rotatable relatively to each other, a bearing sleeve rigidly secured in said main section and provided with a screw-threaded axial opening, a spring connected with said sleeve and said thermometer carrying section and arranged to be wound to exert a torsional stress on said sections and to rotate the thermometer carrying section relatively to the main section when released, a stem connected with said thermometer carrying section having a screw-threaded portion passing through and in engagement with the screw-threaded opening of the sleeve, a stop on said stem arranged to engage said sleeve to arrest the winding of the spring and another stop on said stem arranged to arrest the rotative movement of said thermometer carrying section.

11. A device for returning the mercury to the bulb of a thermometer comprising two sections movable relatively to each other, one of said sections being provided with diametrically opposite openings for the accommodation of a thermometer, means for moving said sections and leaf springs arranged adjacent to said openings, said springs exerting a tension toward each other and adapted to grip the thermometer to prevent accidental dislocation from said openings.

12. A thermometer casing comprising a tubular main section, a tubular thermometer carrying section rotatably mounted on said main section, a bearing sleeve rigidly secured in said main section and provided with a screw threaded axial opening, a spring connected with said sleeve and said thermometer carrying section arranged to be wound to exert a torsional stress on said sections and to rotate the thermometer carrying section relatively to the main section when released, a tubular stem connected with said thermometer carrying section, a screw-threaded projection on said stem passing through and engaging said screw-threaded opening of the sleeve, a stop on said projection arranged to engage said sleeve to arrest the winding of the spring and a stop on said stem adapted to arrest the movement of said thermometer carrying section.

In testimony whereof, I have hereunto set my hand in the presence of two subscribing witnesses.

CLAES W. BOMAN.

Witnesses:
 JOHN A. KEHLENBECK,
 M. H. LOCKWOOD.

Copies of this patent may be obtained for five cents each, by addressing the "Commissioner of Patents, Washington, D. C."